United States Patent [19]

Kenjyo

[11] Patent Number: 4,677,603
[45] Date of Patent: Jun. 30, 1987

[54] OPTICAL RECORDING AND/OR REPRODUCING APPARATUS WITH SYNCHRONOUS FINE AND COARSE ADJUSTING MECHANISMS

[75] Inventor: Hideyuki Kenjyo, Koganei, Japan

[73] Assignee: Olympus Optical Co., Ltd., Japan

[21] Appl. No.: 881,496

[22] Filed: Jul. 2, 1986

Related U.S. Application Data

[63] Continuation of Ser. No. 677,883, Dec. 3, 1984, abandoned, which is a continuation of Ser. No. 304,102, Sep. 21, 1981, abandoned.

[30] Foreign Application Priority Data

Sep. 24, 1980 [JP] Japan ............... 55-132687

[51] Int. Cl.⁴ ............... G11B 7/095; G11B 21/08; G11B 27/30
[52] U.S. Cl. ............... 369/32; 369/44; 369/45
[58] Field of Search ............... 369/32–33, 369/41, 44–46; 250/201

[56] References Cited

U.S. PATENT DOCUMENTS

| | | | |
|---|---|---|---|
| 3,361,873 | 1/1968 | Johnson et al. | 369/44 |
| 3,391,255 | 7/1968 | Gregg | 369/44 |
| 3,894,276 | 7/1975 | Janssen | 369/44 |
| 4,057,833 | 11/1977 | Braat | 358/128 |
| 4,106,058 | 8/1978 | Romeas et al. | 369/33 |
| 4,123,147 | 10/1978 | Hill et al. | 350/285 |
| 4,135,206 | 1/1979 | Kleuters et al. | 369/45 |
| 4,193,091 | 3/1980 | Kleuters et al. | 369/45 |
| 4,236,232 | 11/1980 | Jansen et al. | 369/33 |
| 4,453,239 | 6/1984 | Musha et al. | 369/45 |

OTHER PUBLICATIONS

Van Nostrand's *Scientific Encyclopedia*, Sixth Edition, vol. 1, pp. 1442-1443, 1983.

*Primary Examiner*—Raymond F. Cardillo
*Assistant Examiner*—Wayne R. Young
*Attorney, Agent, or Firm*—Parkhurst & Oliff

[57] ABSTRACT

In an optical recording and/or reproducing apparatus for recording and/or reproducing an information signal on and/or from an optical record disc by projecting a light beam spot onto the rotating disc by means of an objective lens, the objective lens is moved linearly in a disc radial direction over a small distance by means of a fine adjusting mechanism and the fine adjusting mechanism is moved in a stepwise manner in the disc radial direction over a large distance by means of a coarse driving mechanism including a pulse motor. The objective lens is moved together with the fine adjusting mechanism at a high speed and during intervals between successive stepwise movements, the objective lens is moved linearly by the fine adjusting mechanism. In this manner, the objective lens can be driven linearly over the large distance and a desired point of the disc can be quickly accessed.

8 Claims, 24 Drawing Figures

Time →

Time →

OPTICAL RECORDING AND/OR REPRODUCING APPARATUS WITH SYNCHRONOUS FINE AND COARSE ADJUSTING MECHANISMS

This is a continuation of application Ser. No. 677,883 filed Dec. 3, 1984 which in turn is a continuation of application Ser. No. 304,102, filed Sept. 21, 1981, both now abandoned.

BACKGROUND OF THE INVENTION

This invention relates to an optically recording and/or reproducing apparatus which records and/or reproduces an information such as digital information, video information, and audio information by projecting a light flux emitted from a light source such as a laser onto a rotating disc-shaped optical record medium.

In case of recording the information such as digital information, video information, and audio information on a disc-shaped record medium, usually an optically recording method is used. In such an optically recording method, a disc coated with a resist film or a metal thin film, etc., on a glass plate or a plastic plate is used as a record medium, an intensity of a laser beam of a high-power energy is modulated with the information to be recorded, and the laser beam thus modulated is projected onto the disc. The film on the disc is partly melted and evaporated and in this manner the information is recorded on the disc as a fine pit construction. In order to reproduce the information from the disc having such pit construction, the laser beam having a low-power energy and a constant intensity is made incident upon the disc and then a light flux reflected by or transmitted through the disc is detected. In such an optically recording and/or reproducing apparatus, since the laser light beam which is converged by an objective lens is made incident upon the disc, a so-called focussing control should be effected such that the objective lens is moved in its optical axial direction so as to be able to form a small spot with a diameter of about 0.8 $\mu$m on the disc. Further, it is necessary to perform a so-called tracking control such that the light beam is moved in a disc radial direction so that the spot always traces a center of an information track. Usually, as the focussing control mechanism, a moving coil type is used. In the focussing control mechanism of moving coil type, a magnetic field passing through a coil which is wound around an objective lens holder is generated, and the lens holder and thus, the objective lens are deviated in the optical axial direction by supplying to the coil, a compensating signal corresponding to a focussing error, so that a distance between the disc and the objective lens is made always constant. In a usual tracking control mechanism, a galvanomirror including a driving coil is arranged in a light path between the laser light source and the objective lens, and a compensating signal corresponding to a tracking error is supplied to the coil to rotate the mirror, so that the laser light spot is shifted in the disc radial direction according to aforesaid signal.

In the tracking control system using such a galvanomirror, the light beam impinges upon the objective lens at an inclined angle, and therefore aberrations of the objective lens must be corrected strictly over its whole aperture, so that there is a drawback that a design of the lens is difficult and a cost of the lens is very expensive. There are further drawbacks that the galvanomirror itself is very expensive, a miniaturization is limited, and a reliability of this system is rather low.

In the optically recording and/or reproducing apparatus of the type mentioned above, there is further provided a radial driving system for moving an optical system including the objective lens in the disc radial direction, but a backlash of this driving system results in that in case of recording, a track could not be recorded at a desired position with a given constant pitch and in case of reproducing, the track could be hardly traced and the tracking mechanism would be subjected to more severe requirements. Moreover, when a disc having such a pitch deviation reproduced, an interference between neighboring tracks is undesirably occurs. In order to prevent such an interference, it is necessary to take a sufficiently wide track pitch or to use a complicated and expensive mechanism having an extremely high feeding precision in the radial direction. It is apparent that the wider the track pitch is, the lower a recording density becomes and thus, one of the significant characteristics of such an optically recording and/or reproducing system is lost. Moreover, in case of using such an optically recording and/or reproducing apparatus as a digital data memory, that is, a terminal device of a computer, it is necessary for the apparatus to be small in size and simple in construction.

In the above mentioned digital data memory or reproducing apparatus for the video information and the audio information, a random access mechanism for projecting the laser light beam onto any desired position on the disc is provided. In order to shorten an access time so as to effect the random access fast, the precision of the random access might be decreased. Contrary to this in order to make the precision high, the access speed might be decreased. Especially, in case of using the disc having a very high record density and the very narrow pitch between successive tracks, it is very difficult to perform the precise random access at a high speed.

Further, in case of recording or reproducing the information on or from the disc, it is necessary to move the objective lens linearly in the disc radial direction substantially over its radius. However, the known tracking system could not satisfy such a requirement to a full extent.

SUMMARY OF THE INVENTION

The present invention has for its object to overcome the above mentioned drawbacks and provide an optically recording and/or reproducing apparatus which can move the beam spot precisely in the disc radial direction by means of a tracking control mechanism of a simple construction so as to record and/or reproduce information on a disc at a high density.

It is still another object of the invention to provide an optically recording and/or reproducing apparatus in which the light beam can be positioned at any desired position at a high speed in a precise manner.

It is still another object of the invention to provide an optically recording and/or reproducing apparatus in which the light spot can be moved in the disc radial direction in a linear manner.

According to the present invention an optically recording and/or reproducing apparatus for recording and/or reproducing information such as digital information, video information, and audio information by projecting a spot of light beam emitted from a light source onto a rotating disc-shaped optical record medium by means of an optical system including an objective lens, the improvement comprises a fine adjusting mechanism for supporting said optical system movably in a disc radial direction of said disc-shaped record medium and moving the optical system in said disc radial direction within a small distance; a coarse driving mechanism for supporting said fine adjusting mechanism movably in said disc radial direction and moving said fine adjusting mechanism in the disc radial direction over a substantial part of a radius of said record medium; and a driving circuit for driving said fine adjusting mechanism and said coarse driving mechanism in synchronism with each other in such a manner that said light spot is made incident upon the record medium at a desired position.

In a preferred embodiment of the apparatus according to the invention, said coarse driving mechanism is composed of an intermittent driving mechanism which moves said fine adjusting mechanism in the disc radial direction intermittently at a constant pitch. This intermittent driving mechanism may comprise, for example, a pulse motor.

DETAILED DESCRIPTION OF THE PREFERRED EMBODIMENTS

Figure 1:
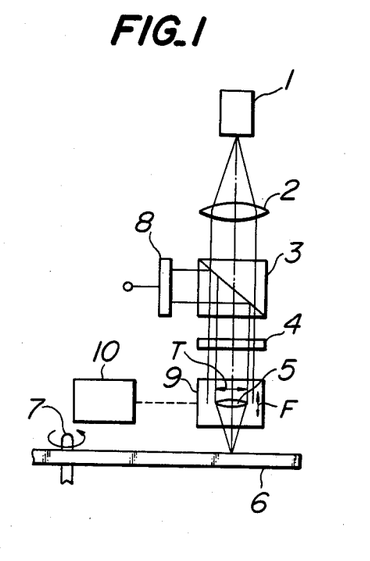
FIG. 1 is a schematic diagram showing one embodiment of an optical system of an optically recording and/or reproducing apparatus according to this invention.

FIG. 1 is a schematic diagram illustrating a basic construction of the optical recording and/or reproducing apparatus according to this invention. In case of recording an information signal by means of this apparatus, a laser light source 1 such as a light-emitting diode laser is modulated with the information signal to be recorded so as to generate a modulated laser light beam. The light beam thus modulated is collimated into a parallel light flux by a collimator lens 2 and passes through a polarizing prism 3 and a quarter-wavelength plate 4. Then, the parallel light flux impinges upon an objective lens 5 and is focussed on an optical disc 6 as a light spot having a very small diameter. The disc 6 is revolved about a spindle 7 at a given fixed speed. In case of recording, the laser light beam has a high power and when this light beam is focussed on the disc 6 so as to melt a metal film on the disc 6 so that the information is recorded along a track having a so-called pit construction. On the contrary, in case of reproducing, the laser light beam with a constant light intensity emitted from the laser light source 1 is focussed on the disc 6 through the objective lens 5 as the light spot. Then the light flux reflected by the disc 6 (the light intensity is modulated in accordance with the pit construction recorded on the disc) is collected by the objective lens 5 and is made incident upon the polarizing prism 3 through the quarter-wavelength plate 4. Since the light beam passes through the quarter-wavelength plate 4 twice, it is reflected by the polarizing prism 3 and is made incident upon a light detector 8. In such a recording and/or reproducing apparatus it is necessary to project the laser beam on the disc 6 as an extremely small spot with a diameter of, for instance, about 0.8 $\mu$m. However, in practice, not only a distance between the objective lens 5 and the disc 6, but also a relative position thereof are deviated, so that a focussing error and a tracking error occur. In order to compensate such a deviation, the objective lens 5 is secured to a two-dimensional driving mechanism 9 so as to move in a disc radial direction as well as in an optical axial direction shown by arrows T and F, respectively. The focussing error and tracking error can be detected by processing an output from the light detector 8. For example, in order to detect the tracking error, the well-known three beam method and wobbling method may be used, but of course any other method may be used. According to this invention, there is further arranged a coarse driving mechamism 10 which moves the two-dimensional driving mechanism 9 including the objective lens 5 and the other optical elements 1, 2, 3, 4 and 8, in the radial direction of the disc 6 over a substantial part of a radius of the disc 6, i.e. a radial length of an information region. Further in this invention, both a fine adjusting mechanism which is arranged in the two-dimensional driving mechanism 9 and moves the objective lens 5 in the radial direction of the disc 6 linearly over a small distance (the detailed construction will be mentioned later) and the coarse driving mechanism 10 are driven cooperatively, so that the beam spot is controlled to be made incident upon any desired position in the information area on the disc 6.

Figure 2A:
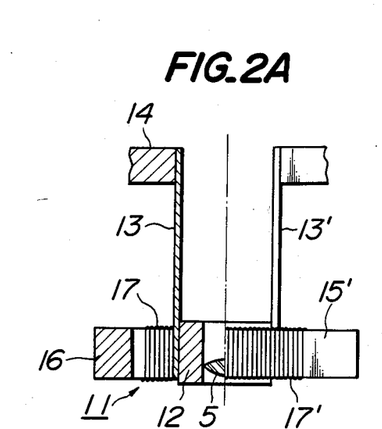
FIGS. 2A and 2B are a partially cross sectional side view and a plan view, respectively illustrating an embodiment of a fine adjusting mechanism of the apparatus according to the invention.
Figure 2B:
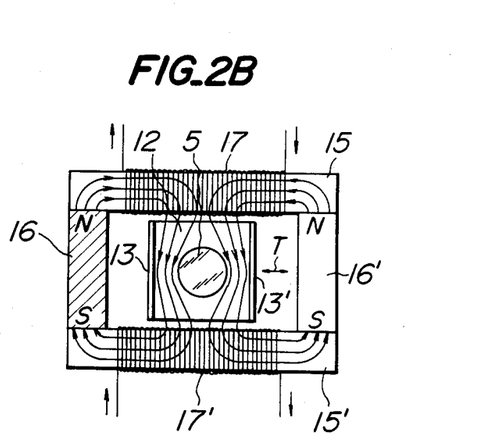

FIGS. 2A and 2B show one embodiment of the fine adjusting mechanism 11 provided in the above mentioned two-dimensional mechanism 9. A movable magnetic member 12 is arranged symmetrically with respect to a plane defined by the optical axis of the objective lens 5. In addition, to this movable magnetic member 12 is secured one end of a pair of leaf springs 13 and 13' arranged symmetrically with respect to the above mentioned plane, the other ends of these leaf springs 13 and 13' being secured to a fixed member 14. Therefore, the objective lens is displaceable in the disc radial direction T. Around the movable magnetic member 12 are arranged a pair of fixed magnetic members 15, 15' and these members are connected with each other by means of a pair of parmanent magnets 16, 16' so as to generate magnetic fluxes shown in FIG. 2B. Coils 17, 17' are wound around the fixed magnetic members 15, 15' in such a manner that they are exposed to the magnetic fluxes. According to this construction if electric currents are supplied to the coils 17, 17' in directions shown in FIG. 2B, the magnetic fluxes passing through the movable magnetic member 12 and thus, the movable magnetic member 12, and the objective lens 5 are driven in the disc radial direction T. An amount of this displacement is almost linear with respect to the electric currents supplied to the coils.

Figure 3A:
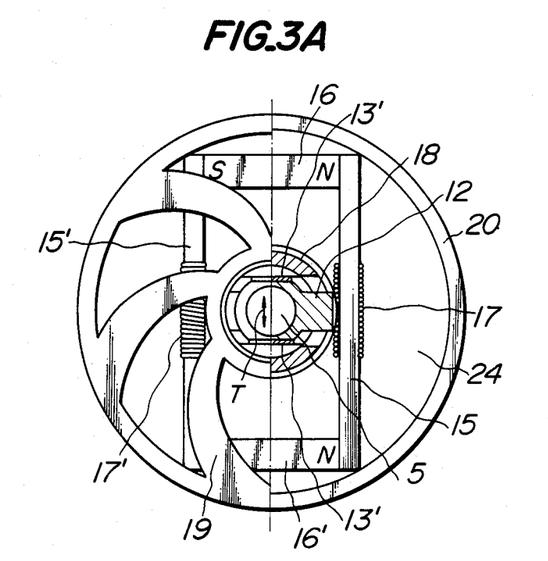
FIGS. 3A and 3B are a plan view and a partially cross sectional side view, respectively depicting another embodiment of the fine adjusting mechanism of the apparatus according to the invention.
Figure 3B:
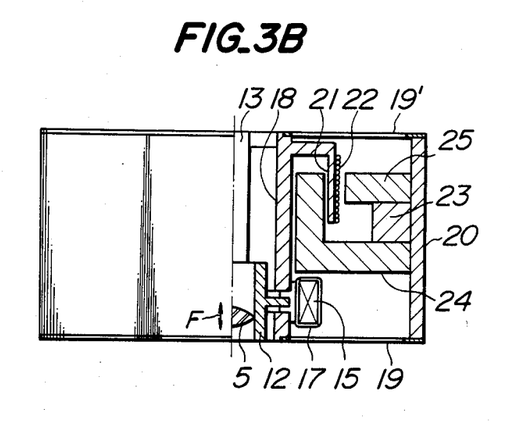

FIGS. 3A and 3B are schematic diagrams showing one embodiment of the two-dimensional objective lens driving mechanism 9 which moves the objective lens 5 two-dimensionally both in the above mentioned tracking direction T and in the optical axial direction F of the objective lens, i.e., the focussing direction. As described above, the objective lens 5 is fixed in a tubular lens holder 12 made of magnetic material. The lens holder 12 is secured to an intermediate cylindrical body 18 by means of a pair of leaf springs 13 and 13'. Therefore, the objective lens 5 is movable in the tracking direction T. The intermediate cylindrical body 18 is secured to an outer cylindrical body 20 by means of a pair of disc-shaped leaf springs 19 and 19' having spiral arms. Therefore, the intermediate cylindrical body 18 is movable in the optical axial direction F of the objective lens 5. The first and second yokes 15 and 15' cooperating with the lens holder 12 made of the magnetic material and permanent magnets 16 and 16' are fixedly secured to the outer cylindrical body 20 by means of suitable connecting means not shown. Therefore, to the intermediate cylindrical body 18 moving in the focussing direction F is only secured the lens holder 12 and thus can be made extremely light in weight and small in size. In order to perform the focussing control by moving the intermediate cylindrical body 18 in the optical axial direction F, a coil 22 is wound around a ring 21 formed integrally with the intermediate body 18 and a permanent magnet 23 cooperating with this coil and ring-shaped yokes 24 and 25 are secured to the outer cylindrical body 20.

In the above mentioned two-dimensional driving mechanism 9 of the objective lens, if electric currents corresponding to the tracking error are applied to first and second coils 17, 17', it is possible to move the objective lens 5 in the tracking direction T. In this case, a sufficiently large force for this movement can be produced and this movement becomes almost linear. In such a driving mechanism, since the laser beam is made incident upon the objective lens, as a parallel light flux with a sufficiently larger diameter than that of the objective lens 5 and the objective lens 5 moves always perpendicularly to the light flux, aberrations do hardly occur and thus, the objective lens 5 can be simple in construction and cheaper in cost.

In the embodiment mentioned above the objective lens 5 is arranged in the lens holder 12. The remaining elements, such as laser light source 1, collimator lens 2, polarizing prism 3, quarter-wavelength plate 4 and light detector 8 may be composed into a single body and this body may be secured to the outer body 20.

Figure 4:
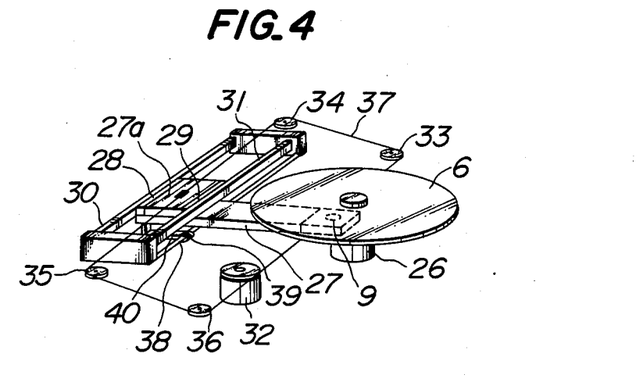
FIG. 4 is a perspective view illustrating one embodiment of the optical recording and/or reproducing apparatus according to this invention.

FIG. 4 is a perspective view showing an embodiment of the optically recording and/or reproducing apparatus according to this invention comprising the two-dimensional driving mechamism illustrated in FIG. 3. The disc 6 is arranged so as to rotate at a high speed by means of a motor 26, and the two-dimensional driving mechanism 9 shown in FIG. 3 and the optical system illustrated in FIG. 1 are secured to one end of an arm 27 which extends underneath the disc 6 in parallel therewith. The other end of the arm 27 is secured to a base plate 27a which is slidably secured by linear ball-bearings 28, 29 to guide rails 30, 31. To the base plate 27a is fixed an endless wire 37 which extends through a pulse motor 32 and pulleys 33, 34, 35, 36. When the pulse motor 32 is energized, the arm 27 and thus, the objective lens driving mechanism 9 is moved intermittently in the radial direction of the disc 6. This intermittent moving mechanism constitutes the coarse driving mechanism according to the invention. Further, a permanent magnet bar 38 which is magnetized in its longitudinal direction is fixedly arranged in a driving direction of the arm 27, and a coil 39 which is wound so as to surround the permanent magnet bar 38 is secured to the other end of the arm 27 by means of a stay 40. In such a construction since an electric current is induced in the coil 39 according to Fleming's rule when the arm 27 and thus, the objective lens driving mechanism 9 move stepwise by means of the pulse motor 32. Then an amount of movement of the two-dimensional driving mechanism 9 by this stepping movement can be detected.

In the embodiment illustrated in FIG. 4, the arm 27 is moved in a stepwise manner in the radial direction of the disc 6 by transmitting an intermittent rotation of the pulse motor 32 to the arm 27 through the wire 37. In a modified embodiment, a lead screw which is engaged with a nut secured to the other end of the arm 27 may be arranged along the moving direction of the arm 27, and this lead screw may be rotated intermittently by means of the pulse motor 32 so as to move the arm 27 and thus, the objective lens driving mechanism 9 intermittently in the radial direction of the disc 6. Further in the embodiment mentioned above, the detector for measuring an amount of movement of the two-dimensional driving mechanism 9 is composed of a linear dynamo comprising the permanent magnet bar 38 and the coil 39, but it is possible to detect an amount of the displacement by means of tachometer, linear-encoder, rotary-encoder, etc. Moreover, various driving sources other than the pulse motor 32 may be used for moving the arm 27 intermittently.

Figure 5:
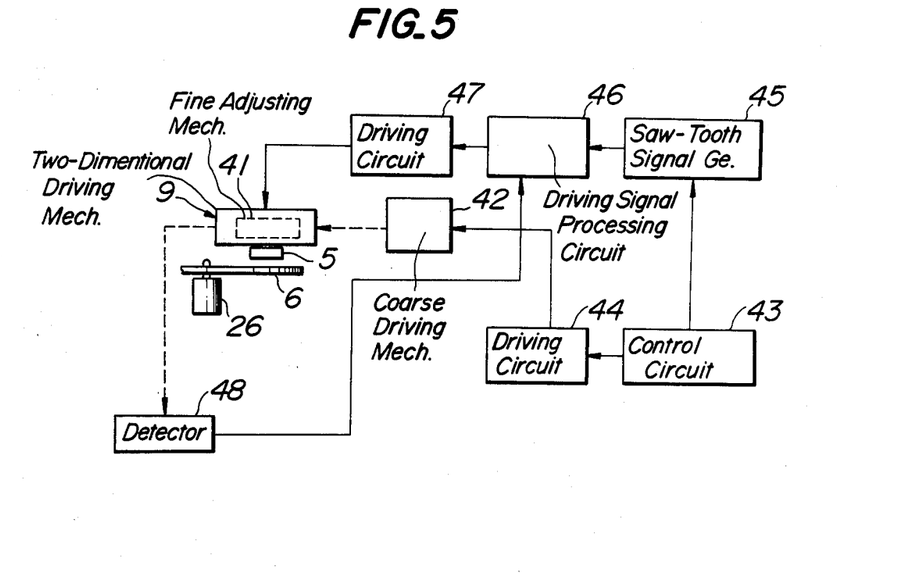
FIG. 5 is a circuit diagram showing one embodiment of a driving circuit of the apparatus according to the invention.
Figures 6A, 6B:
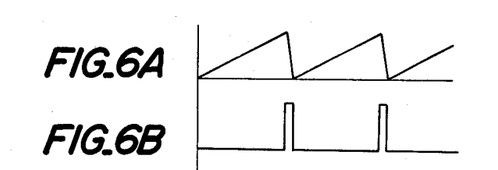
FIGS. 6A to 6D are waveforms of signals appearing at various points in the circuit shown in FIG. 5.
Figures 6C, 6D:
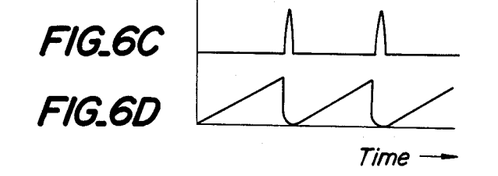

FIG. 5 is a block diagram showing one embodiment of a driving circuit for controlling the fine adjusting and coarse driving mechanisms. The objective lens 5 included in the two-dimensional driving mechanism 9 is so constructed as to move linearly in the radial direction within a small distant such as several hundreds micron meters by means of the fine adjusting mechanism 41. Further the fine adjusting mechanism 41 and the objective lens 5 are moved intermittently in said disc radial direction over a relatively long distant covering the information area of the disc by means of the intermittent moving mechanism 42 having the pulse motor 32. Then this coarse driving mechanism 42 is controlled by a timing pulse illustrated in FIG. 6B which is supplied from a control circuit 43 through a driving circuit 44. The fine adjusting mechanism 41 is controlled by a saw-tooth signal shown in FIG. 6A which is supplied from a saw-tooth signal generator 45 through a driving signal processing circuit 46 and a driving circuit 47. The saw-tooth signal generator 45 is triggered by the timing pulse generated from said control circuit 43. When the two-dimensional driving mechanism 9 including the fine adjusting mechanism 41 is moved by the coarse driving mechanism 42, a detection signal illustrated in FIG. 6C and representing a given amount of displacement of the fine adjusting mechanism 41 of one pitch is generated by means of the displacement detector 48 and is supplied to the driving signal processing circuit 46. In the driving signal processing circuit 46, after inversing the displacement detection signal and adjusting its bias level suitably, a signal thus processed is added to the saw-tooth signal supplied from the generator 45. In this manner a driving signal for the fine adjusting mechanism 41 is generated as illustrated in FIG. 6D.

Figure 7:
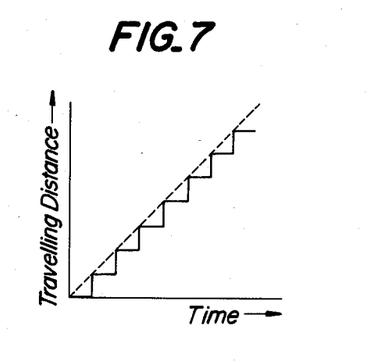
FIG. 7 is a diagram explaining a movement of an objective lens.

FIG. 7 is a schematic diagram showing a manner of moving the objective lens 5 by means of the fine adjusting mechanism 41 and the intermittent coarse driving mechanism 42, wherein a horizontal and a vertical axes show a time and a travelling distance, respectively. As shown by a solid line, the objective lens 5 is moved stepwise over the long distant by means of the coarse driving mechanism 42. Within each stepwise movement the objective lens 5 is moved in a continuous manner by means of the fine adjusting mechanism 41. If an amount of displacement of the fine adjusting mechanism 41 by means of the coarse driving mechanism 42 is not detected, a timing between a step moving point and a reset point of the saw-tooth waveform might be deviated due to a system delay so that discontinuous points might be occurred. On the contrary, in the embodiment shown in FIG. 5, since an amount of actual displacement of the fine adjusting mechanism 41 by means of intermittent moving mechanism 42 is detected by the displacement detector 48 and then the detected displacement is fed-back negatively to the driving signal processing circuit 46, the reset point of the saw-tooth waveform and the moving point of the stepwise movement are always made identical with each other, so that the objective lens 5 can be moved linearly as well as continuously as shown by a broken line in FIG. 7.

In one embodiment according to the invention, a travelling distance of one step by means of the intermittent driving mechanism 42 is set to 24 μm and an adjustable range, i.e. a dynamic range by means of the fine adjusting mechanism 41 is set to 300 μm. Then the objective lens 5 can be moved linearly over the whole radius of the disc 6 by means of a combination of the fine and coarse driving mechanisms 41 and 42. In this manner, according to the invention the precise stepping feed by means of the intermittent moving mechanism comprising the pulse motor is combined with the linear movement by means of the fine adjusting mechanism 41 controlled by the saw-tooth waveform having a given time constant. Therefore, in case of recording, it is possible to form a spiral track having a constant pitch on the disc 6. Further in case of reproducing, the information can be picked-up without track-interference due to tracking error. In this case, the pulse motor 32 of the intermittent driving mechanism may be driven by pulses which are generated from the control circuit 43 in accordance with a predetermined procedure. That is to say, a number of stepping feeds of the objective lens 5 during one minute varies according to the number of disc rotations per minute and thus, the number of stepping movements can be determined in accordance with the number of disc rotations. Further, an amount of movement is detected by the displacement detector 48 and the detected amount is fedback negatively. However, if this feedback control is deviated due to a secular variation of the circuit, there is a possibility that a few discontinuous points occur. Therefore, in case of recording a data information the data signal may be recorded as being separated into sectors. For instance, one round track is divided into five blocks and twenty-six sectors are existent in each block and in each sector is recorded an index including index address, track address, sector address, error check code, etc., and between successive blocks is also recorded a pre-index composed of a repeated waveform of about 500 bits. Then, the stepping movement by means of the pulse motor 32 may be performed during this pre-index interval. Also, in such a case, the number of stepping movements per minute may be determined previously.

Figure 8:
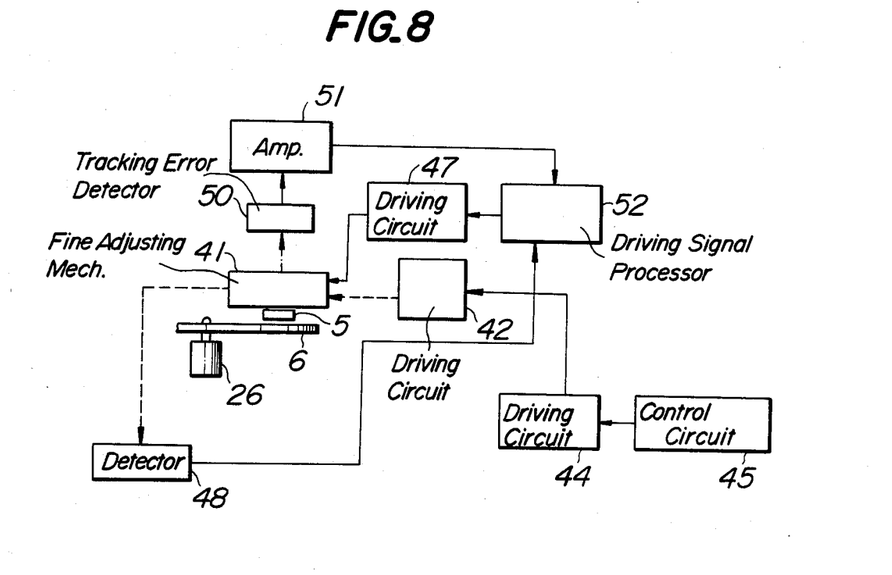
FIG. 8 is a circuit diagram showing another embodiment of the driving circuit.
Figures 9A, 9B:
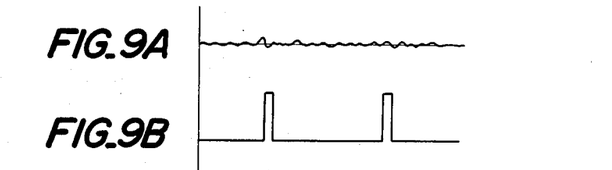
FIGS. 9A to 9D are waveforms of signals at various points of the circuit shown in FIG. 8.
Figure 9C:
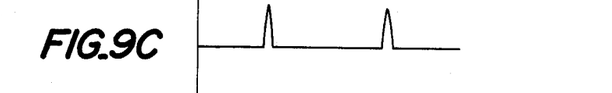
Figure 9D:
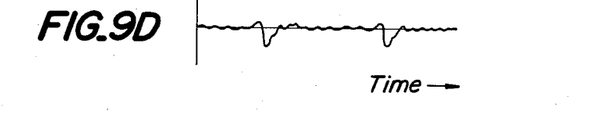

FIG. 8 is a schematic diagram showing one embodiment of the driving circuit of the apparatus for reproducing an information signal from the disc 6. Like as the embodiment illustrated in FIG. 5, the objective lens 5 is moved by the fine adjusting mechanism 41 as well as the intermittent coarse driving mechanism 42. In this embodiment, a laser light flux is made incident upon the disc 6 rotating by means of the rotation motor 26, and then the laser light flux reflected by the disc 6 is received by the detector 8 (see FIG. 1). Then the output from detector is supplied to a tracking error detecting circuit 50. The tracking error signal thus obtained is amplified by an amplifier 51 and then the amplified tracking error signal illustrated in FIG. 9A is supplied to a driving signal processing circuit 52. Further, pulses generated from the control circuit 45 according to the predetermined procedure are supplied to the pulse motor driving circuit 44, the pulses being illustrated in FIG. 9B. Then the pulse motor 32 is driven by these pulses. The movement of the coarse driving mechanism 42 by means of the motor 32 and the wire 37 (see FIG. 4) is detected by the displacement detector 48, and an output signal obtained from the displacement detector 48 and illustrated in FIG. 9C is supplied to the driving signal processing circuit 52 and is mixed with the output signal of the amplifier 51 so that a driving signal illustrated in FIG. 9D is generated. This output signal is supplied to the driving circuit 47 and then the fine adjusting mechanism 41 is driven. In this manner, an information recorded on the disc 6 can be reproduced, while the objective lens is fed in the disc radial direction in a linear manner.

Figure 10:
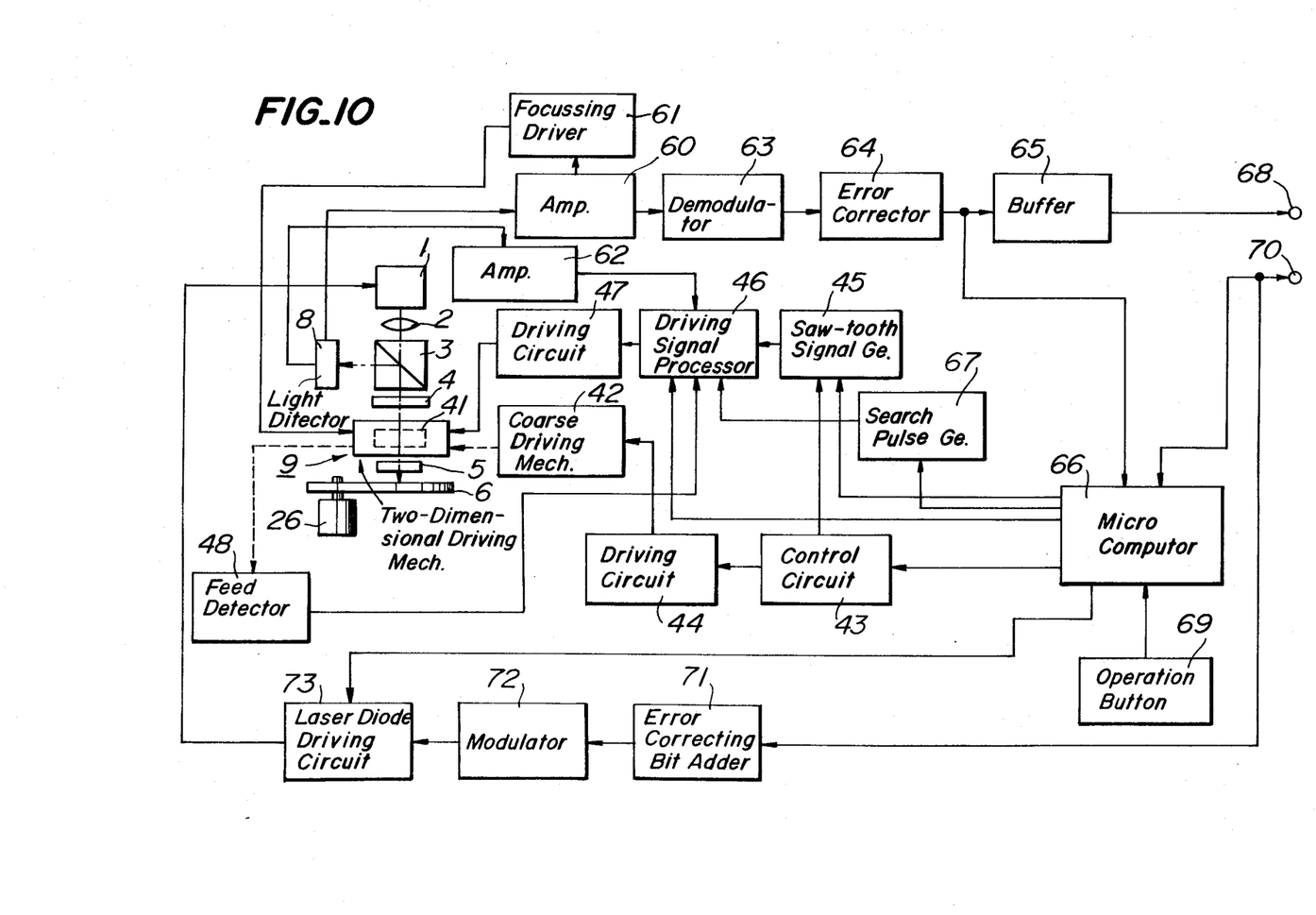
FIG. 10 is a block diagram illustrating an overall construction of an embodiment of the recording and/or reproducing apparatus according to this invention.
Figures 11A, 11B:
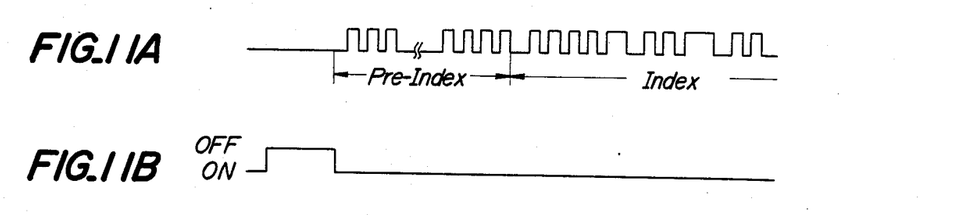
FIGS. 11A to 11F are waveforms for explaining the operation of the apparatus illustrated in FIG. 10.
Figure 11C:
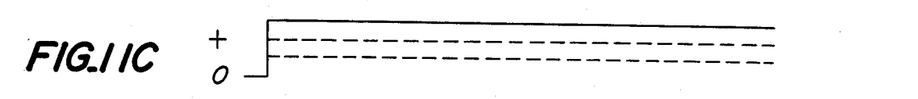
Figure 11D:
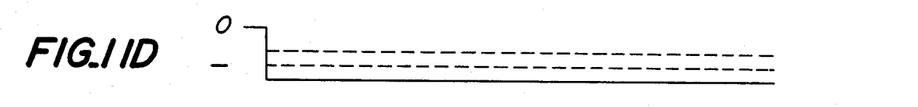
Figure 11E:
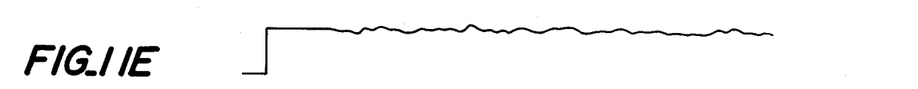
Figure 11F:
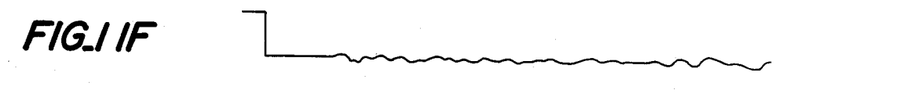

FIG. 10 is a block diagram illustrating an overall construction of one embodiment of the recording and-/or reproducing apparatus according to this invention. In this apparatus, a random access is performed. Similar to the embodiment mentioned above, the apparatus comprises laser light source 1, collimator lens 2, polarizing prism 3, quarter-wavelength plate 4, objective lens 5, light detector 8, and motor 26 for rotating a disc 6, fine adjusting mechanism 41, intermittent coarse driving mechanism 42, driving circuits 47, 44 for moving the mechanisms 41, 42, control circuit 43, saw-tooth signal generator 45, driving signal processing circuit 47, and displacement detector 48. In this embodiment the focussing error signal obtained by a signal supplied from the light detector 8 is applied to an amplifier 60 and the amplified signal is supplied to the coil 22 in the two-dimensional driving mechanism 9 through a focussing driving circuit 61, so that a focussing movement of the objective lens 5 is carried out. On the other hand, the tracking error signal supplied from the light detector 8 is supplied through an amplifier 62 to the driving signal processing circuit 46. An output signal from the circuit 46 is supplied to the coils 17, 17' in the fine adjusting mechanism 41 through the driving circuit 47 and then a tracking movement of the objective lens 5 is performed. Under such circumstances, the information recorded on the disc 6 is reproduced. An output of the amplifier 60 is also applied to a demodulating circuit 63 so as to demodulate an information signal and the information signal is supplied to a micro-computer 66 through an error correcting circuit 64 for correcting the error. In the micro-computer 66 a data address supplied from the external is compared with that of a current data and a difference between said addresses is first calculated. Then an amount of displacement of the objective lens 5 to be performed is calculated on the basis of said difference. Then a data is supplied to the control circuit 45 after a signal is applied to the driving signal processing circuit 46 so as to stop the tracking servo temporarily. In this manner a number of pulses corresponding to the displacement mentioned above is supplied to the pulse motor driving circuit 44 and the pulse motor 32 is moved at a high speed so that the objective lens 5 is moved into a given position whithin a short time period. After the objective lens 5 has travelled by a predetermined distance, the tracking servo is made once again operative by the micro-computer 66 and then the above mentioned address check is carried out again. The tracking servo is performed in the following manner so as to supplement a precision of the pulse motor 32. As mentioned above, the distance of one stepping feed is about 25 μm and thus a given data point to be accessed usually exists within this 25 μm distance. The movement by means of the stepping motor is stopped at a position nearest to the given data address. In this point, after the tracking servo being effective once again, the comparison of address positions is carried out again in the same procedure mentioned above by means of the micro-computer 66 so as to calculate a difference between the desired position and a current one, and then a data representing the detected difference is supplied from the micro-computer 66 to a search pulse generator 67. Then, the generator 67 supplies a tracking control stop signal illustrated in FIG. 11B to the driving signal processing circuit 46. The said data is also supplied to the processing circuit 46 and a search pulse of positive or negative polarity shown in FIGS. 11C and 11D is supplied to the driving circuit 47 as a bias level. After the search pulse has finished, the tracking servo is made operative again and then the tracking signal having the positive or negative bias level superposed thereon as shown in FIGS. 11E and 11F appears at an output of the driving circuit 47. As shown by dotted lines in FIGS. 11C and 11D the bias level is determined in accordance with the data signal supplied from the micro-computer 66. When an amount of difference between address positions is large, the objective lens 5 has to be moved by a large distance by means of the fine adjusting mechanism 41 and thus, the bias level should be made large. After the exact address position has been searched out, a required data shown in FIG. 11A is applied to a data output terminal 68 through an output buffer 65. In this manner, by driving the objective lens at a high speed by means of the pulse motor 32 and then the objective lens is driven into a given position precisely by means of the fine adjusting mechanism, it is possible to perform a very precise random access into the desired data point within a short time period.

In FIG. 10 a circuit portion which is not used for the random access is further indicated. At first an operation button 69 is arranged to carry out a necessary operation manually. In case of recording data, a data signal supplied from a data input terminal 70 is added with error correcting bits by means of an error correcting bit adding circuit 71. In a modulation circuit 72 an output signal supplied from the error correcting bit adding circuit 71 is modulated in a manner set up beforehand and then is supplied to a laser diode driving circuit 73 so that the laser diode 1 is modulated. To the laser diode driving circuit 73 an operation signal is also supplied from the micro-computer 66. In case of reproducing, the laser light beam is not modulated and the light intensity is made low compared with recording so as not to destroy the information or not to effect undesired recording on the record medium. Further, the light intensity may be changeable automatically corresponding to a difference between inner and outer circular speeds so as to project the light beam with a constant light energy over the whole information area.

According to the invention, since the objective lens 5 is arranged in the two-dimensional driving mechanism 9 and the movement in radial direction of the disc 6 is carried out in combination with the fine adjusting mechanism 41 and the coarse driving mechanism 42, it is possible to perform high density recording and/or reproducing of the information and fast random access so that the apparatus according to this invention may be advantageously used as a mass storage memory having a sufficiently fast speed for a terminal of computer.

What is claimed is:

1. In an optical apparatus for processing information by projecting a light beam onto a rotating disc-shaped optical record medium using an optical system which includes an objective lens, the improvement comprising:

a fine adjusting means for supporting said optical system and moving the optical system continuously at a substantially constant speed in a first radial direction with respect to said record medium and within a predetermined dynamic range;

a coarse driving means for supporting said fine adjusting means and moving said fine adjusting means intermittently with a given pitch not greater than said dynamic range in said first radial direction with respect to said record medium and over a substantial part of a radius thereof, said coarse driving means being driven in response to a step-like pulse signal; and a control means for controlling said fine adjusting means and said coarse driving means in synchronism with one another by driving said coarse driving means in said first radial direction with said step-like pulse signal, driving said fine adjusting means in a second radial direction in synchronism with said step-like pulse signal and driving said fine adjusting means in said first radial direction such that the average moving speed of the optical system produced by said coarse driving means is equal to said constant speed produced by said fine adjusting means so that said optical system is moved continuously at said given constant speed in said first radial direction over said substantial part of said radius of said record medium.

2. An apparatus according to claim 1, wherein said fine adjusting mechanism comprises a movable magnetic member coupled to said objective lens of the optical system, a fixed magnetic member having a portion opposite to said movable magnetic member, means for generating a magnetic flux passing through said movable and fixed magnetic members, and a coil wound around said portion of the fixed magnetic member.

3. An apparatus according to claim 2, wherein said movable magnetic member is supported movably also in an optical axial direction of the objective lens and the apparatus further comprises a focussing mechanism for compensating a focussing error due to a deviation in a distance between the record medium and the objective lens.

4. In an optical apparatus for processing information by projecting the light beam onto a rotating disc using an optical system, the improvement comprising:
 a fine adjusting means for supporting said optical system and moving said optical system continuously and linearly in a first radial direction with respect to said disc within a predetermined dynamic range;
 a coarse driving means for supporting said fine adjusting means and moving said fine adjusting means intermittently with respect to said first radial direction of the disc over a substantial part of said disc, said coarse driving means in response to step-like pulse signal; and
 control means for controlling said fine adjusting means and said coarse driving means in synchronism with one another by driving said coarse driving means in said first radial direction with said step-like pulse signal, driving said fine adjusting means in a second radial direction in synchronism with said step-like pulse signal and driving said fine adjusting means in said first radial direction such that the optical system is moved continuously and linearly in said first radial direction over said substantial part of the disc.

5. An apparatus according to claim 4 wherein said control means includes means for driving said fine adjusting means with a sawtooth signal synchronous with said step-like pulse signal.

6. An apparatus according to claim 4 wherein said control means includes means for driving said fine adjusting means by an output signal representing the difference between a sawtooth signal and the inverse of said step-like pulse signal.

7. In an optical apparatus for processing information by projecting a light beam onto a rotating disc-shaped optical record medium using an optical system which includes an objective lens, the improvement comprising:
 a fine adjusting means for supporting said optical system and moving the optical system continuously at a substantially constant speed in a first radial direction with respect to said record medium and within a predetermined dynamic range;
 a coarse driving means for supporting said fine adjusting means and moving said fine adjusting means intermittently with a given pitch not greater than said dynamic range in said first radial direction with respect to said record medium and over a substantial part of a radius thereof, said coarse driving means being driven in response to a step-like pulse signal;
 control means for controlling said fine adjusting means in synchronism with said coarse driving means by driving said coarse driving means in said first radial direction with said step-like pulse signal, driving said fine adjusting means in a second radial direction in synchronism with said step-like pulse signal and driving said fine adjusting means in said first radial direction such that the average moving speed of the optical system produced by said coarse driving means is equal to said constant speed produced by said fine adjusting means so that said optical system is moved continuously at said given constant speed in said first radial direction over said substantial part of said radius of said record medium; and
 means for detecting a tracking error signal and driving said fine adjusting means in accordance with said tracking error signal to compensate for a tracking error caused by relative deviation between said light beam and said record medium in a radial direction of said record medium.

8. In an optical apparatus for processing information by projecting a light beam onto a rotating disc-shaped optical record medium using an optical system which includes an objective lens, the improvement comprising:
 a fine adjusting means for supporting said optical system and moving the optical system continuously at a substantially constant speed in a first radial direction with respect to said record medium and within a predetermined dynamic range;
 a coarse driving means for supporting said fine adjusting means and moving said fine adjusting means intermittently with a given pitch not greater than said dynamic range in said first radial direction with respect to said record medium and over a substantial part of the radius thereof, said coarse driving means being driven in response to a step-like pulse signal;
 control means for controlling said fine adjusting means in synchronism with said coarse driving means by driving said coarse driving means in said first radial direction with said step-like pulse signal, driving said fine adjusting means in a second radial direction in synchronism with said step-like pulse signal and driving said fine adjusting means in said first radial direction such that the average moving speed of the optical system produced by said coarse driving means is equal to said constant speed produced by said fine adjusting means so that said optical system is moved continuously at said given constant speed in said first radial direction over said substantial part of said radius of said record medium;
 address detecting means for detecting a current position of the light means by sensing addresses recorded on the record medium; and
 means for detecting a difference between said current position and a desired position.

* * * * *